United States Patent [19]
Colvis et al.

[11] Patent Number: 5,673,287
[45] Date of Patent: Sep. 30, 1997

[54] DUAL MODE AMPLIFIER NETWORK HAVING AN ISOLATOR IN A DIGITAL PATH AND A FILTER IN AN ANALOG PATH

[75] Inventors: Christopher O. Colvis, Lake Zurich; Dale G. Schwent, Hoffman Estates; Donald M. Yochem, Lake Villa, all of Ill.

[73] Assignee: Motorola, Inc., Schaumburg, Ill.

[21] Appl. No.: 767,151

[22] Filed: Dec. 16, 1996

Related U.S. Application Data

[63] Continuation of Ser. No. 58,848, May 10, 1993, abandoned.

[51] Int. Cl.⁶ .................................................. H04L 27/34
[52] U.S. Cl. ............................... 375/216; 375/311; 455/93; 455/95; 332/103; 332/117; 332/144; 379/58
[58] Field of Search .......................... 375/216, 295, 375/302, 298, 296, 297, 309, 311; 455/74, 78, 89, 93, 95, 110, 54.1, 33.2, 38.3; 332/103, 117, 144; 364/135, 180; 379/58

[56] References Cited

U.S. PATENT DOCUMENTS

| | | | |
|---|---|---|---|
| 5,060,294 | 10/1991 | Schwent | 455/93 |
| 5,175,871 | 12/1992 | Kunkel | 455/69 |
| 5,251,331 | 10/1993 | Schwent et al. | 455/117 |
| 5,276,914 | 1/1994 | Ishizuka et al. | 455/83 |
| 5,333,176 | 7/1994 | Barke et al. | 455/90 |
| 5,428,664 | 6/1995 | Kobayashi | 379/58 |

*Primary Examiner*—Wellington Chin
*Assistant Examiner*—William Luther
*Attorney, Agent, or Firm*—Donald C. Kordich

[57] ABSTRACT

The dual mode amplifier network of the present invention enables a radiotelephone to operate efficiently in both the U.S. Digital Cellular mode and the FM analog cellular mode. Multiple, switched branches (110 and 120) permit one branch (110) with an isolator (103) to be used in the in the U.S. Digital Cellular mode while the other branch (120) is switched out. In the analog mode, the transmit filter branch (120) is used while the isolator branch (110) is switched out.

4 Claims, 1 Drawing Sheet

DUAL MODE AMPLIFIER NETWORK HAVING AN ISOLATOR IN A DIGITAL PATH AND A FILTER IN AN ANALOG PATH

This is a continuation of application Ser. No. 08/058,848, filed May 10, 1993 and now abandoned.

FIELD OF THE INVENTION

The present invention relates generally to the field of amplifiers and particularly to amplifier switching.

BACKGROUND OF THE INVENTION

The rapid expansion of the number of cellular radiotelephones coupled with the desire to provide additional services has prompted the use of an improved communication technique, time division multiple access (TDMA). TDMA increases system capacity over the current analog system through the use of digital modulation and speech coding techniques. Even though a TDMA communication channel is comprised of numerous time slots, a radiotelephone operating in the TDMA system only uses every third time slot.

A linear modulation technique, π/4 shifted differential quadrature phase shifted keying (π/4 DQPSK), is used to transmit the digital information over the channel. The use of linear modulation in the U.S. Digital Cellular (USDC) system provides spectral efficiency allowing the use of 48.6 kbps channel data rates. π/4 DQPSK transmits the data information by encoding consecutive pairs of bits, commonly known as symbols, into one of four phase angles (±π/4, ±3π/4) based upon gray encoding. These angles are then differentially encoded to produce an 8 point constellation.

Radiotelephones designed for use in the U.S. Digital Cellular system are required to operate in both the analog and digital modes. The digital mode uses the π/4 DQPSK modulation, and can be implemented using a linear transmitter. The analog mode uses conventional frequency modulation and allows the use of higher efficiency non-linear transmitters.

The linear transmitter is not as efficient at its average power out as a non-linear transmitter. This is not a problem, however, when the DQPSK modulation is used since the transmitter operated in this mode is switched with a ⅓ duty cycle. This duty cycle is a result of the transmitter only operating for one time slot out of every three. Since the transmitter is on only ⅓ of the time, current drain in the transmitter is actually less than that of transmitters in existing FM products.

There is a problem, however, when the linear transmitter is used with continuous FM at the some average power level. This transmitter will have poor efficiency and will draw much more current than conventional FM transmitters. There is a resulting need for a dual mode power amplifier network that operates efficiently in both digital and analog modulation systems.

SUMMARY OF THE INVENTION

The present invention encompasses a dual mode network that has two paths. The first path has first switching means coupled to the network input and to isolation means. Second switching means couples the isolation means to the network output. Third switching means, in the second path, couples to the network input to filtering means. Fourth switching means couples to the filtering means to the network output.

DETAILED DESCRIPTION OF THE PREFERRED EMBODIMENT

Figure 1:
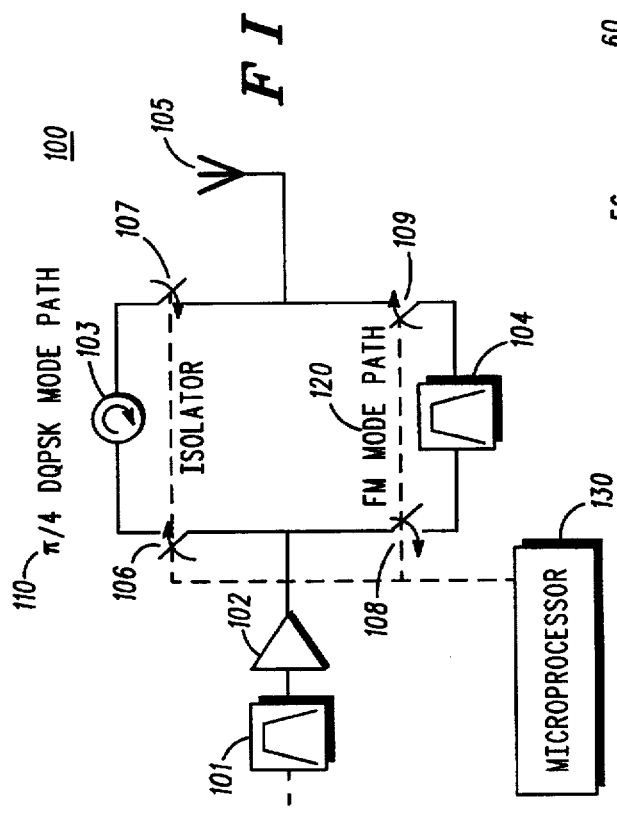
FIG. 1 illustrates a block diagram of the dual mode network of the present invention.

The dual mode network of the present invention is illustrated in FIG. 1. This network (100) provides high efficiency and good linearity from the same transmitter in both the π/4 DQPSK modulation mode and the FM mode.

Referring to FIG. 1, the network (100) is comprised of a bandpass filter (101) and power amplifier (102) coupled to two branches (110 and 120). The bandpass filter (101) keeps noise in the signal to be transmitted below −80 dBm, in the frequency range of 869–894 MHz, at the output of the power amplifier (102).

The power amplifier (102), in the preferred embodiment, is a three stage GaAsFET, a typical example being a Fujitsu FMC080802. This power amplifier (102) performs the task of amplification of signals applied to its input.

The branch (110) of the network (100) used in the π/4 DQPSK mode includes an isolator (103) that is coupled to the output of the power amplifier (102) through a switch (106). The output of the isolator (103) is coupled to the antenna (105) through another switch (107). The isolator (103), in the preferred embodiment, is a broadband isolator that operates in the frequency range of 779 MHz–894 MHz. A typical example of such an isolator is a TDK CU41K2. The isolater (103) performs the task of preventing external signals from mixing in the power amplifier and causing spurious emissions.

The branch (120) of the network (100) used in the FM mode includes a bandpass transmit filter (104) coupled to the output of the power amplifier (102) through a switch (108) and also coupled to the antenna (105) through another switch (109). This transmit filter (104) has a pass band in the range of 824.00 MHz–849.00 MHz.

The switches (106–109) in each of the branches (110 and 120) are controlled by a microprocessor (130). These switches (106–109), in the preferred embodiment, are pin diode RF switches. Other embodiments could use other types of controllable switches such as FET RF switches or other ways of isolating each branch from the power amplifier (102) at the appropriate time.

In operation, when the network of the present invention is used in a radiotelephone operating in the digital cellular system, the branch with the isolater is used. In this case, the microprocessor (130) opens the two switches (108 and 109) in the FM mode branch (120) to prevent this branch from loading the power amplifier (102) while it is driving the isolator branch (110). The switches (106 and 107) in the π/4 DQPSK mode branch (110) are closed, connecting the power amplifier (102) to the antenna (105) through the isolator (103).

When the network (100) of the present invention is used in a radiotelephone in the analog cellular mode, the FM mode branch (120) with the transmit filter (104) is used. In this case, the two switches (106 and 107) in the π/4 DQPSK mode branch (110) are opened to prevent this branch from loading the power amplifier (102) while it is driving the bandpass filter branch (120). The switches (108 and 109) in the FM mode branch (120) are closed, connecting the power amplifier (102) to the antenna (105) through the transmit filter (104).

The network (100) of the present invention provides at least two advantages over the prior art. The first advantage is the predictable output impedance that is presented to the power amplifier by the isolater. This allows the transmitter's linearity requirement to be relaxed since the power amplifier will be guaranteed a low voltage standing wave ratio (VSWR) over all conditions. When the power amplifier is designed to work directly into the transmit filter block and antenna, it's linearity specification is very stringent. This is to insure that the power amplifier meets occupied bandwidth requirements into a load that could have a high VSWR under extreme conditions. By lowering the linearity requirements on the transmitter, it is possible to use a more efficient power amplifier.

The second advantage comes from the reduction in the path loss the power amplifier now sees between itself and the antenna. Isolators typically have much less insertion loss than the available transmit filter blocks that meet FM mode requirements. With less loss in the output path, the power amplifier is able to work at a lower average power output and still meet radio output power specifications. Since the power amplifier's output power is lower its peak current handling requirements are also lowered. This permits the use of smaller power amplifier devices.

Besides the two main advantages discussed above, the isolator also provides isolation from strong incoming signals. With the proper amount of isolation, signals are prevented from being conducted back into the transmitter. If these signals got back into the transmitter they could mix with the transmit signal and be retransmitted out of the radio at levels that are not within the spurious emissions specification.

With the linearity requirements reined and the size of the power amplifier devices reduced it becomes possible to use a standard high efficiency transmitter in the USDC dual mode radio. This is an advantage over the prior art load switch. With the load switch, it is necessary to have devices that can handle large peak currents that flow through the power amplifier at top power steps. The currents are higher with the load switch because the losses are greater in the output path. This makes the device work at a higher average power output level.

With the prior art transmit filter blocks typically used, specifications require the power amplifier to operate at an average power output of at least 31.2 dBm in the π/4 DQPSK mode. Experimentation data shows that available high efficiency power amplifiers, designed to saturate at 32 dBm, will not meet linearity requirements at a peak power output of 34 dBm under any load conditions. Presently, the only devices available that can handle these powers and high currents are bipolar devices. Bipolar devices are limited in their efficiency capabilities. With the dual mode amplifier network of the present invention, it is possible to use high efficiency GaAsFETs In the preferred embodiment, using the Fujitsu FMC080802 three stage GaAsFET module with limited optimizing, the circuit met intermodulation distortion (IMD) requirements in the π/4 DQPSK mode at the specified radio output power. In the FM mode, the network of the present invention made possible a power amplifier current drain that is less than prior art USDC dual mode portable power amplifiers with load switching. If the FM mode of the circuit is optimized, the current drain can be improved by another 40 mA.

Figure 2:
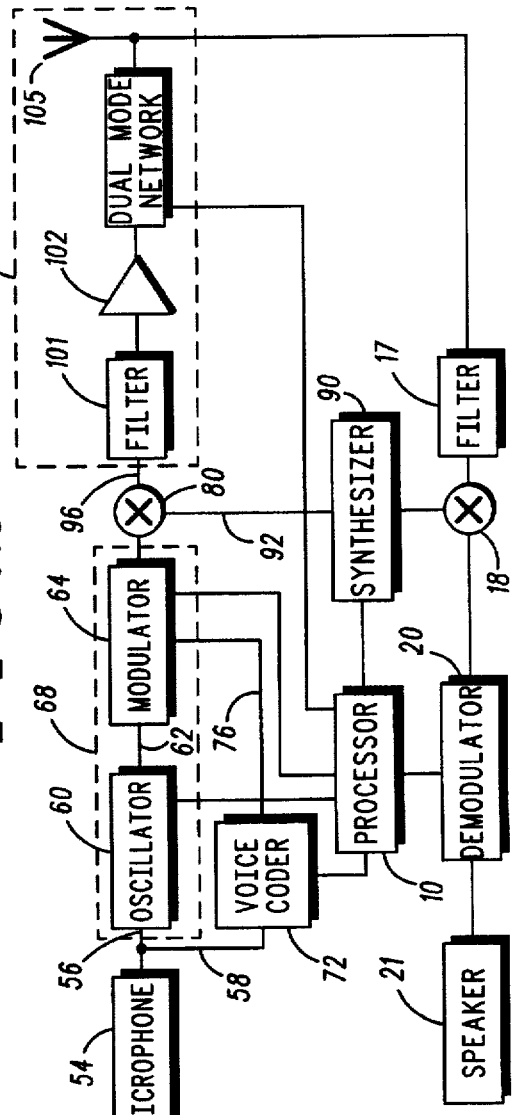
FIG. 2 illustrates a block diagram of a typical radiotelephone using the dual mode network of the present invention.

FIG. 2 illustrates a block diagram of how the network (100) of the present invention is used in a typical radiotelephone. The microphone (54) converts voice signals into an information signal. The information signal supplied on line (56) is utilized when, similar to conventional cellular, radiotelephone communications, a frequency modulated information signal is to be generated by the radiotelephone. The information signal supplied on line (58) is used when a discrete, encoded signal, modulated to form a composite modulated information signal, is to he generated by the radiotelephone.

The information signal generated on line (56) is supplied to a voltage controlled oscillator (60) where the information signal is combined with an oscillating signal of a certain frequency. A frequency modulated information signal (62) is generated by the voltage controlled oscillator (60) to a modulator (64). When the radiotelephone is to transmit a frequency modulated information signal, the modulator (64) does not alter the frequency modulated information signal (62), but, rather, "passes-through" the frequency modulated information signal. The oscillator (60) and modulator (64) may together comprise a hybrid modulation apparatus (68).

The information signal (58) is supplied to a vocoder (72) where the analog information signal is digitized and encoded according to an encoding scheme, and generates a discrete, encoded signal (76) that is supplied to the modulator (64). The modulator (64) modulates the discrete, encodod signal (76) to form a composite, modulated information signal of a predetermined frequency.

The modulated information signal, modulated according to either a frequency modulation technique or a composite modulation technique, is supplied to a mixer (80). The mixer (80) mixes this signal with an offset transmission-frequency carder wave generated by a synthesizer (90) and supplied to the mixer (80). The mixer (80) mixes the modulated information signal with the carder wave (92). The mixer (80) then generates a modulated information signal (96) upon a carrier wave of a carrier frequency determined by the oscillating frequency of synthesizers (90 and 60).

The modulated information signal (96) is coupled to the dual mode network of the present invention. A processor (10) provides control signals to control operation of the present invention as well as the oscillator (60), the vocoder (72), the modulator (64), and the synthesizer (90), respectively, and to control modulation of the information signal generated by the microphone (54).

The processor (10) controls whether the information signal generated by the microphone (54) is modulated by the oscillator (60) or encoded by the vocoder (72) to form a composite modulated information signal.

FIG. 2 further illustrates the radiotelephone receive circuit for a signal transmitted to the antenna (105). The signal transmitted to the antenna (105) is supplied to a filter (17) that passes signals of desired frequencies to the mixer (18). The mixer (18) receives an oscillating signal from the synthesizer (90) and generates a mixed signal that is supplied to a demodulator (20). The demodulator (20) supplies a demodulated, electrical information signal to a speaker (21). The processor (10) may supply a signal to the demodulator (20) to control its operation. The speaker (21) converts the electrical information signals into audible signals.

We claim:

1. A dual mode amplifier switching network for use in a radiotelephone with a digital cellular transmit mode and an analog cellular transmit mode, the radiotelephone having an antenna and a controller and further having a power amplifier for providing a digital modulated signal when in the digital cellular transmit mode and for providing a frequency modulated signal when in the analog cellular transmit mode, the switching network comprising:

a first path including,
    a first switch coupled to the power amplifier;
    an isolation device coupled to the first switch; and
    a second switch coupled between the isolation device and the antenna;
  a second path including,
    a third switch coupled to the power amplifier;
    a filter coupled to the third switch; and
    a fourth switch coupled between the filter and the antenna;
  wherein the controller closes the first and second switches and opens the third and fourth switches when the radiotelephone is in the digital cellular transmit mode, thus conducting the digital modulated signal along the first path, and wherein the controller opens the first and second switches and closes the third and fourth switches when the radiotelephone is in the analog cellular transmit mode, thus conducting the analog modulated signal along the second path.

2. The network of claim 1 wherein the distal cellular transmit mode is a π/4 differential quadrature phase shifted keying mode.

3. The network of claim 1 wherein the annalog cellular transmit mode is a frequency modulation mode.

4. A radiotelephone with a digital cellular transmit mode and an analog cellular transmit mode, the radiotelephone comprising:

an antenna;
  a controller for controlling the radiotelephone;
  a power amplifier for providing a digital modulated signal when in the digital cellular transmit mode and for providing a frequency modulated signal when in the analog cellular transmit mode; and
  a switching network having a first path for conducting the digital modulated signal during the digital cellular transmit mode and a second path for conducting the frequency modulated signal during the analog cellular transmit mode, wherein, the first path including,
    a first switch coupled to the power amplifier, the first switch closed by the controller during the digital cellular transmit mode and opened by the controller during the analog cellular transmit mode;
    an isolation device coupled to the first switch; and
    a second switch coupled between the isolation device and the antenna, the second switch closed by the controller during the digital cellular transmit mode an opened by the controller during the analog cellular transmit mode; and
  the second path including,
    a third switch coupled to the power amplifier, the third switch opened by the controller during the digital cellular transmit mode and closed by the controller during the analog cellular transmit mode;
    a filter coupled to the third switch; and
    a fourth switch coupled between the filter and the antenna, the fourth switch opened by the controller during the digital cellular transmit mode and closed by the controller during the analog cellular transmit mode.

* * * * *

UNITED STATES PATENT AND TRADEMARK OFFICE
CERTIFICATE OF CORRECTION

PATENT NO. : 5,673,287
DATED : September 30, 1997
INVENTOR(S) : Colvis et al.

It is certified that error appears in the above-indentified patent and that said Letters Patent is hereby corrected as shown below:

Claim 2

In column 5, line 1, of claim 2, please replace "distal" with --digital--.

Claim 3

In column 5, line 1 of claim 3, please replace "annalog" with --analog--.

Signed and Sealed this

Sixth Day of January, 1998

Attest:

BRUCE LEHMAN

Attesting Officer

Commissioner of Patents and Trademarks